US005270088A

United States Patent [19]

Grasse

[11] Patent Number: 5,270,088

[45] Date of Patent: Dec. 14, 1993

[54] GRAPHIC PACKAGE INCORPORATING A DUAL FUNCTION SEPARATING LAYER

[75] Inventor: Peter B. Grasse, Woodbury, Minn.

[73] Assignee: Minnesota Mining and Manufacturing Company, St. Paul, Minn.

[21] Appl. No.: 853,094

[22] Filed: Mar. 18, 1992

[51] Int. Cl.[5] ........................ B32B 3/00; B32B 7/06

[52] U.S. Cl. ........................ 428/40; 40/299; 428/31; 428/42; 428/195; 428/352; 428/354; 428/421; 428/448; 428/474.4; 428/516; 428/906; 428/914

[58] Field of Search ..................... 428/31, 40, 42, 906, 428/914, 195, 421, 474.4, 448.516, 352, 354; 40/299

[56] References Cited

U.S. PATENT DOCUMENTS

| | | | |
|---|---|---|---|
| 1,990,701 | 2/1935 | Knight | 428/40 |
| 2,426,462 | 8/1947 | Marksberry | 41/33 |
| 2,629,670 | 2/1953 | Rathke | 428/40 |
| 2,816,655 | 12/1957 | Crozier | 428/40 |
| 3,344,012 | 9/1967 | Af Strom | 161/99 |
| 3,556,894 | 1/1971 | Bernard | 156/235 |
| 3,896,245 | 7/1975 | Keeling | 428/352 |
| 4,273,816 | 6/1981 | Tollette | 428/35 |
| 4,632,872 | 12/1986 | Gallagher et al. | 428/350 |
| 4,640,727 | 2/1987 | Janssen | 156/240 |
| 4,678,690 | 7/1987 | Palmer et al. | 428/31 |
| 4,895,746 | 1/1990 | Mertens | 428/40 |
| 4,919,994 | 4/1990 | Incremona et al. | 428/141 |
| 4,967,740 | 11/1990 | Riedel | 128/156 |
| 5,104,719 | 4/1992 | Kamen | 428/40 |

FOREIGN PATENT DOCUMENTS

| | | | |
|---|---|---|---|
| 7719330.7 | 1/1986 | Fed. Rep. of Germany . | |
| 3625904A1 | 2/1988 | Fed. Rep. of Germany . | |
| 3625904 | 2/1988 | Fed. Rep. of Germany | 428/352 |
| WO91/03381 | 3/1991 | PCT Int'l Appl. . | |
| 1604775 | 12/1981 | United Kingdom . | |

*Primary Examiner*—Ellis P. Robinson
*Assistant Examiner*—Nasser Ahmad
*Attorney, Agent, or Firm*—Gary L. Griwold; Walter N. Kirn; Steven E. Skolnick

[57] ABSTRACT

A graphic package comprises a plurality of graphics including at least a first graphic and a second graphic. The package further includes a dual function separating layer which is intermediate the first and second graphics. The separating layer comprises a substrate having an upper surface and a lower surface. A release coating is provided on the upper surface of the substrate for releasably retaining the first graphic on the substrate and an adhesive is provided on the lower surface of the substrate for temporarily bonding the second graphic to the substrate. The graphic package may be a pad or a roll.

19 Claims, 1 Drawing Sheet

GRAPHIC PACKAGE INCORPORATING A DUAL FUNCTION SEPARATING LAYER

BACKGROUND OF THE INVENTION

1. Field of the Invention

This invention relates to a graphic package and, more particularly, to a graphic package comprising a plurality of graphics which are separated from each other by dual function separating layers that simultaneously act as both release liners and premasks.

2. Description of the Related Art

Graphics have long been used to customize, personalize, decorate and protect motor vehicles. The graphic may be as simple as a pin stripe which extends along a side of the motor vehicle in an aesthetically contrasting color relative to the body. More elaborate graphics have been used to decorate larger panels of a motor vehicle such as the hood as has been done with certain sports cars. Graphics have also been applied to commercial vehicles to convey advertising or other important information. In recent years, it has become fashionable to embellish pickup trucks with bold, vividly colored graphics. In addition, transparent films (with or without graphic designs) have been used in areas of high abrasion to protect the underlying surface.

The construction of a conventional, presently known graphic package is illustrated in FIG. 1. In FIG. 1, a graphic package 10 comprises a polymeric film 12 having a graphic design 14 printed on one surface and an adhesive 16 on an opposite surface. Film 12 is releasably secured to a release liner 18 and is protected by a premask 20. Graphic-bearing film 12 is typically applied to a motor vehicle (not shown separately in the drawings) by simultaneously removing release liner 18 and drawing a squeegee or rubber roller over premask 20 to adhesively bond the film to the motor vehicle. Once any wrinkles, bubbles or swells have been removed, premask 20 is stripped from the film. Thus, release liner 18 acts as a temporary support for the film until the film is applied to the motor vehicle. Premask 20 protects graphic design 14 from unintentional damage or marring until the film has been applied. The premask may also serve as a carrier and maintain the registration of die cut graphics.

It can also be seen that for each graphic film 12, two layers of waste material (release liner 18 and premask 20) are generated. The release liner and premask are typically formed of paper or similar materials and thereby contribute to the continued reduction of an already diminishing natural resource. (Plastic release liners and premasks are also known.) Furthermore, the considerable volume of waste material increases the cost of the graphic and clutters the workplace, necessitating constant efforts to gather and discard the waste. A conventional graphic construction is illustrated in U.S. Pat. No. 4,678,690, "Premasked Decal," issued Jul. 7, 1987 to Palmer et al.

Thus, there is considerable need for a graphic package which reduces the volume of waste associated with each graphic. Such a package would not only conserve valuable natural resources but may reduce the cost of manufacturing and/or using the graphic.

SUMMARY OF THE INVENTION

This invention relates to a graphic package comprising a plurality of graphics, including at least first and second graphics, with a dual function separating layer therebetween. The dual function separating layer comprises a substrate having upper and lower surfaces. A release coating on the upper surface releasably retains the first graphic on the substrate; an adhesive on the lower surface temporarily bonds the second graphic to the substrate.

The graphic package may be in the form of a stack or pad wherein each graphic is separated from an adjacent graphic by the dual function layer. The graphic package may also be in the form of a roll comprising alternating layers or windings of graphics and dual function separating layers.

The graphics may comprise a film having an adhesive (such as a pressure sensitive adhesive) on one surface and a graphic design on the same or an opposite surface.

The dual function separating layer may comprise a substrate (such as paper, synthetic polymers or natural polymers) with a release coating (such as silicones, polysilicones, fluorocarbons, polyfluorocarbons, waxes or polyoelfins) on its upper surface and an adhesive (such as a pressure sensitive adhesive) on its lower surface.

In a package comprising a plurality of graphics separated from each other by dual function layers, each dual function layer act as a "release liner" relative to the overlying graphic and simultaneously acts as a "premask" relative to the underlying graphic. Thus, graphic packages according to the invention employ a single disposable separating layer per graphic rather than the two layers of waste material found in present constructions.

BRIEF DESCRIPTION OF THE DRAWINGS

The invention will be more fully appreciated with reference to the following drawings in which similar reference numerals designate corresponding or analogous components and in which.

DETAILED DESCRIPTION OF THE PREFERRED EMBODIMENTS

Figure 1:
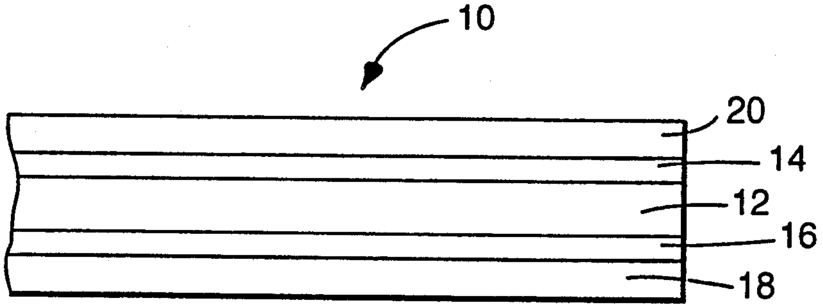
Fig. 1 PRIOR ART
FIG. 1 is an enlarged elevational view of a presently known graphic package.
Figure 2:
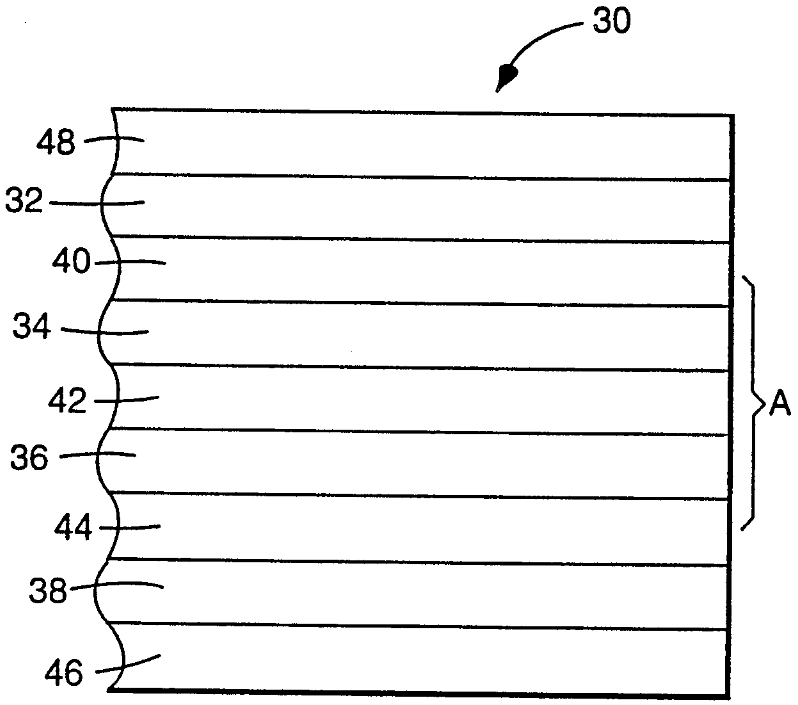
FIG. 2 is an enlarged elevational view of a graphic package according to the invention.

Turning now to the drawings, FIG. 2 illustrates a graphic package 30 according to the invention. Graphic package 30 comprises a plurality of graphics, 32, 34, 36 and 38 that are separated by dual function separating layers 40, 42 and 44. More specifically, graphics 32 and 34 are separated by dual function layer 40. Similarly, graphics 34 and 36 are separated by dual function layer 42. In the same manner, graphics 36 and 38 are separated by dual function layer 44. Graphic package 30 further, and optionally, comprises a base 46 which underlies graphic 38 and a protective top sheet 48 which overlies graphic 32. As explained more fully below, each dual function separating layer simultaneously performs as a "release liner" relative to the overlying graphic and as a "premask" relative to the underlying graphic in the package.

Figure 3:
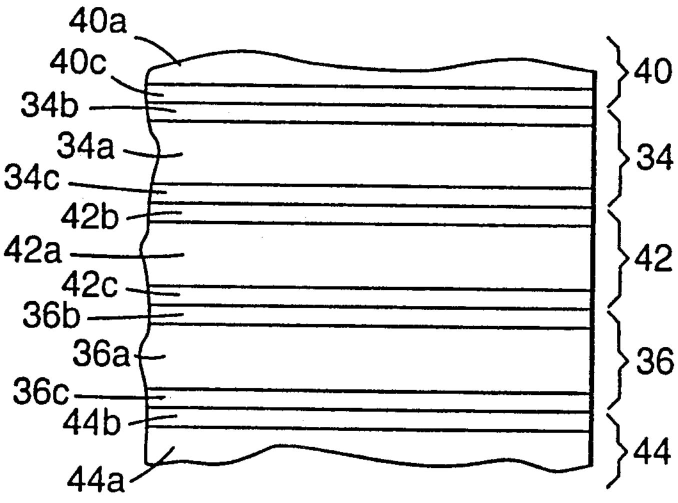
FIG. 3 is an enlarged view of the area of interest in FIG. 2 designated by the reference letter A.

The construction of graphic package 30 is shown with greater specificity in FIG. 3 which is an enlarged view of the area of interest designated by the reference letter A in FIG. 2. More particularly, graphics 32, 34, 36 and 38 have similar constructions although only graphics 34 and 36 are illustrated in detail. Graphic 34 and graphic 36 comprise, respectively, films 34*a* and 36*a*. Films 34*a* and 36*a* may be formed from a variety of materials such as polyethylene, polypropylene, flexible poly(vinyl halides) (e.g., poly(vinyl chloride) and poly(-vinyl fluoride)), copolymers of ethylene, propylene, vinyl chloride and vinyl fluoride, polyesters (e.g. polyethylene terephthalate), polyimides, polycarbonates, polyamides, poly vinylidene fluorides, polyurethanes, poly(phenylenesulfide) and laminates of these materials. The films may be transparent to visible light, opaque or metallized. They may be clear, colored or both clear and colored, and may have a smooth or matte finish depending on the particular appearance that is to be imparted to the graphics. The graphic films typically have a thickness in the range of 25 to 380 microns (μ).

Graphic film 34*a* and graphic film 36*a* include on upper surfaces thereof, respectively, graphic designs 34*b* and 36*b*. The graphic designs may be provided by a variety of inks and the like, including those based on urethanes, acrylics, vinyls, vinyl-acrylic blends and epoxies. The graphic designs may include or be supplemented with noncolored or clear materials to provide a protective top coat (not shown separately in the drawings). The graphic designs may be applied to the graphic films by a variety of conventional techniques such as screen printing, ink-jet printing, electronically, electrographically, electrophotographically and thermo-mass transfer, the particular technique being selected depending upon the materials used to provide the graphic designs and the graphic films. The graphic designs may extend over the entire surface of their respective graphic films or only portions thereof. Alternatively, if the graphic films are colored, the graphic designs may be printed in a contrasting color or may be omitted.

Graphic 34 and graphic 36 each further comprise, respectively, a layer of a film adhesive 34*c* and 36*c* which are applied to, respectively, graphic films 34*a* and 36*a*. The film adhesive may be applied to the surface of the graphic film which bears the graphic design or may be applied to the opposite surface. In the former case, it is preferred that the graphic design be disposed intermediate the graphic film and the film adhesive.

Film adhesives 34*c* and 36*c* may be provided by any of a wide variety of adhesives conventionally employed to bond graphic articles to a surface. Pressure sensitive adhesives are particularly useful in this regard. Adhesives based on acrylates, natural rubbers, styrene-isoprene-styrene block copolymers, and silicone-based adhesives such as polydimethylsiloxane and polymethylphenylsiloxane may be used. Adhesives useful in the invention may incorporate additives such as ground glass, titanium dioxide, silica, glass beads, waxes, tackifiers, low molecular weight thermoplastics, oligomeric species, plasticizers, pigments, metallic flakes, metallic powders, etc. so long as they are provided in an amount that does not materially adversely affect the ability of the adhesive to bond the graphic film to a surface.

The surface of the adhesive which is to be applied to an article may be treated to permit repositioning of the graphic before a permanent bond is formed. Adhesive repositionability may be achieved by providing a layer of minute glass bubbles on the adhesive surface as illustrated in U.S. Pat. No. 3,331,729 to Danielson et al. Alternatively, the adhesive may be formulated to provide low initial adhesion but greater ultimate adhesion. An example of such an adhesive is an isooctyl acrylate/acrylimide adhesive to the backbone of which is grafted a monovalent siloxane polymeric moiety having a number average molecular weight between about 500 and 50,000.

As shown in FIG. 3, graphic 34 and graphic 36 are separated from each other by dual function separating layer 42. Dual function layer 42 comprises a substrate 42*a* having a release coating 42*b* on an upper surface and an adhesive 42*c* on a lower (i.e., opposite) surface.

The substrate for the dual function layer may comprise paper or a variety of synthetic and natural polymeric films such as polyolefins (e.g., polyethylene, polypropylene and copolymers thereof), polyesters (e.g., polyethylene terephthalate and copolyesters based thereon), polyamides (e.g., nylon 6,6), urea-aldehydes (e.g., urea-formalydehyde), poly(vinyl halides) e.g., poly(vinyl chloride) and poly(vinyl fluoride)), polyacrylates (e.g., poly(methyl methacrylate)), polyurethanes, and rubbers. Typically, the substrate has a thickness of about 12 to 250 μ, more preferably about 50 to 75 μ.

Suitable examples of pre-adhesive coated paper-based substrates include the 6700 series commercially available from American Biltrite, Tape Products Division, Moorestown, N.J. and SCPM 3, commercially available from Minnesota Mining and Manufacturing Company, Saint Paul, Minn. Suitable examples of pre-adhesive-coated polymeric substrates include those which are commercially available from Ivex Corp., Newton, Mass. and presently having the commercial trade designations 25-203LC and 40-303LC. (A release coating, described more fully below, would need to be added to these commercially available substrates before they could be used as dual function layers according to the invention.)

Release coating 42*b* may be provided by any of a variety of materials which are presently used to provide release coatings. In general, the release coating may be solvent or aqueous based and may be cured by condensation, hydrosilation or radiation. Radiation-curable systems may be epoxy-functional, acrylate-functional or ene-thiol-functional. Low adhesion back sizes based on urethane chemistry may also be used. Coatings of silicone, polysilicones, fluorocarbons, polyfluorocarbons, waxes or polyolefins are useful.

Examples of commercially available materials suitable for use as release coatings in the invention include SS4191 (General Electric Silicones, Waterford, N.Y.) and the 7600 series of silicones (Dow Corning, Midland, Mich.). Substrates pre-coated with a release material are available from Boise Casade, White Paper Division, International Falls, Minn. and James River Company, H. P. Smith Division, Bedford Park, Ill. (An adhesive layer, described more fully below, would need to be added to these pre-coated commercial materials before they could be used as dual function layers according to the invention.) The release coating may range in thickness from a monomolecular layer to about 8 μ, preferably about 4 μ.

Adhesive 42*c* for dual function separating layer 42 is deposited on a surface of substrate 42*a* opposite that which carries release coating 42*b*. The adhesive may be provided by any of a variety of materials which have been conventionally employed as so-called "premask" adhesives including natural rubbers, acrylates, kratons, or other pressure sensitive type adhesives. The adhesive is selected to provide less adhesion between dual function layer 42 and graphic 36 than film adhesive 36*c* provides between graphic 36 and the surface to which the graphic is to be applied, the significance of which is explained more fully hereinbelow.

Dual function layers 40 and 44 have constructions similar to that shown for dual function layer 42. Thus, with reference to FIG. 3, dual function layer 40 comprises substrate 40*a* with a layer of adhesive 40*c* (the release coating not being shown separately). Likewise, dual function layer 44 comprises substrate 44*a* with release coating 44*b* (the adhesive layer not being shown separately).

In assembly, graphics 32, 34, 36 and 38 and dual function separating layers 40, 42 and 44 are individually prepared and then laminated together to provide a pad or stack similar to that shown in FIG. 2. For example, graphic 34 may be prepared by providing a roll or sheet of film 34*a* of appropriate dimensions. One surface of film 34*a* has graphic design 34*b* (if included) applied thereto such as by screen printing or the like. The opposite surface has film adhesive 34*c* deposited thereon by techniques such as roll coating, extrusion coating, gravure printing, Mayer bar, knife blade, and the like. (Alternatively, the graphic design and the film adhesive may be applied to the same surface of the graphic film.) Graphics 32, 36 and 38 may be prepared in a similar manner, although the specific manufacturing technique employed for one graphic need not necessarily be utilized to prepare the other graphics. Also, it will be understood that each graphic in a package need not have an identical graphic design or any graphic design.

Dual function separating layer 42 may be prepared by providing a roll or sheet of substrate 42*a* of appropriate dimensions. One surface of substrate 42*a* has release coating 42*b* deposited thereon by various techniques such as roll coating, extrusion coating, gravure printing, Mayer bar, knife blade, and the like. The opposite surface of the substrate has adhesive 42*c* deposited thereon by similar techniques. The order in which the release coating and the adhesive are applied is not critical.

Once the various graphics and dual function separating layers have been individually prepared, they may be assembled in a graphic package by laminating them together in alternating fashion so as to provide a stack or pad such as illustrated in FIG. 2. (Alternatively, the graphics and separating layers may be wound around a core to provide a roll in which event the first and second graphics could comprise contiguous sections of a continuous graphic layer.) The lowermost graphic in package 30 (graphic 38 in FIG. 2) may be applied to base 46 which can be formed of paper, cardboard, plastic film or the like. The uppermost graphic in package 30 (graphic 32 in FIG. 2) may have top sheet 48 applied thereto to protect the uppermost graphic and the graphic package as a whole from unintentional marring or damage prior to use. Top sheet 48 may have a construction similar to that described hereinabove for each of the dual function separating layers although the provision of a release coating would not be required. Thus, the top sheet may have a construction similar to that found in presently used and so-called "premasks." Base 46 and top sheet 48 are optional.

With reference to FIGS. 2 and 3, graphic package 30 is readily and easily employed in typical commercial and industrial environments. As an example, graphic 32 is separated from dual function layer 40 with top sheet 48 (if included) being temporarily retained in place. Separation of graphic 32 from dual function layer 40 is facilitated by the film adhesive for graphic 32 (not shown separately in the drawings) being in contact with the release coating for dual function layer 40 (also not shown separately in the drawings). Thus, dual function separating layer 40 performs as a "release liner" relative to overlying graphic 32.

Graphic 32 is then applied to an appropriate substrate by hand or with a squeegee (e.g. a felt block), roller or other mechanical applicator device to firmly adhere the graphic to the substrate and to remove any bubbles, wrinkles, swells or the like. Once graphic 32 has been properly positioned and applied to the substrate, top sheet 48 may be stripped away.

Graphic 34, the next graphic in the package, may be applied in a similar manner. That is, graphic 34 is separated from dual function layer 42, this separation being facilitated by film adhesive 34*c* being in contact with release coating 42*b*. Dual function layer 42 thus acts as a "release liner" for overlying graphic 34. Dual function layer 40 is temporarily retained in place and functions as a "premask" relative to underlying graphic 34. Graphic 34 is then applied to a substrate in the manner described hereinabove by hand or by using a squeegee, roller, or other mechanical applicator device. Once graphic 34 has been applied, dual function layer 40 is stripped away. The remaining graphics are similarly applied.

Use of the graphic package may be facilitated by intentionally and partially delaminating the graphics from their associated dual function layers. Thus, in the case of graphic package 30, a slight delamination may be effected at one end of each of graphics 32, 34 and 36 relative to the underlying dual function separating layer. (In the case of graphic 38, a separation would be effected relative to base 46.)

It will be appreciated that a graphic package according to the invention employs a dual function separating layer. One function of the separating layer is as a "release liner" relative to the overlying graphic layer in the package. The second function of the separating layer is as a "premask" relative to the underlying graphic layer. Thus only a single separating layer is required for each graphic rather than two layers as are presently employed. Consequently, graphic packages according to the invention generate less waste, conserve natural resources, and may be less costly to make and/or use.

Reasonable variations and modifications are possible within the scope of the foregoing specification and drawings without departing from the spirit of the invention which is defined in the accompanying claims.

I claim:

1. A graphic packaging having a verticle array comprising:

(a) a plurality of graphics including at least a first graphic and a second graphic; and (b) a dual function separating layer intermediate said first and second graphics, said separating layer comprising a substrate having upper and lower surfaces, a release coating on said upper surface for releasably retaining said first graphic on said substrate, and an adhesive permanently on said lower surface for temporarily bonding said second graphic to said substrate, thereby providing less adhesion between said second graphic and the surface to which said second graphic is to be applied, and said dual function separating layer provides a protective premask layer for said second graphic.

2. A graphic package according to claim 1 wherein each of said first and second graphics comprises a film having a layer of a film adhesive on a surface thereof.

3. A graphic package according to claim 2 wherein said film comprises a polymeric material.

4. A graphic package according to claim 3 wherein said film adhesive is a pressure sensitive adhesive.

5. A graphic package according to claim 4 wherein one of said first and second graphics further comprises a graphic design formed on a surface of the film therefore.

6. A graphic package according to claim 5 wherein said graphic design is formed on the same surface of said film which has said layer of film adhesive thereon.

7. A graphic package according to claim 5 wherein said graphic design is formed on a surface of said film opposite the surface having said layer of film adhesive thereon.

8. A graphic package according to claim 1 wherein the substrate for said separating layer is formed from a material selected from the group consisting of paper, synthetic polymers and natural polymers.

9. A graphic package according to claim 8 wherein said synthetic polymer is selected from the group consisting of polyolefins, polyamides, urea-aldehydes, poly(vinyl halides), polyacrylates and polyurethanes.

10. A graphic package according to claim 8 wherein said release coating is provided by a material selected from the group consisting of silicones, polysilicones, fluorocarbons, polyfluorocarbons, waxes and polyolefins.

11. A graphic package according to claim 8 wherein said adhesive on said separating layer is a pressure sensitive adhesive.

12. A graphic package according to claim 11 wherein said adhesive on said separating layer is provided by a material selected from the group consisting of acrylics, natural rubbers, styrene-isoprene-styrene block copolymers, and silicone-based compositions.

13. A graphic package according to claim 12 wherein said first graphic includes an adhesive and can be applied to an article, and further wherein the adhesion between said first graphic and said article is greater than the adhesion between said separating layer and said second graphic. consisting of acrylics, natural rubbers, styrene-isoprene-styrene block copolymers, and silicone-based compositions.

14. A graphic package according to claim 11 wherein each of said plurality of graphics is separated from an adjacent graphic by a separating layer and further wherein the plurality of graphics and separating layer(s) are arranged in a stack.

15. A graphic package according to claim 11 wherein said graphic package is a roll.

16. A graphic package according to claim 1 wherein said package is a roll.

17. A graphic package according to claim 1 wherein said graphic package is a pad.

18. A graphic package according to claim 17 wherein said graphic package further comprises a base underlying and at least temporarily secured to said second graphic.

19. A graphic package according to claim 18 wherein said graphic package further comprises a top sheet overlying and at least temporarily secured to said first graphic.

* * * * *

UNITED STATES PATENT AND TRADEMARK OFFICE

CERTIFICATE OF CORRECTION

PATENT NO. : 5,270,088

DATED : December 14, 1993

INVENTOR(S) : Peter B. Grasse

It is certified that error appears in the above-indentified patent and that said Letters Patent is hereby corrected as shown below:

Col. 4, line 16, "e.g.," should read --(e.g.,--.

Col. 4, lines 18-19, "polyureathanes" should read --polyurethanes--.

Col. 8, lines 11-13, should read --second graphic.--.

Signed and Sealed this

Eighth Day of November, 1994

Attest:

Bruce Lehman

BRUCE LEHMAN

*Attesting Officer*

*Commissioner of Patents and Trademarks*